(12) United States Patent
Yang et al.

(10) Patent No.: US 6,788,721 B2
(45) Date of Patent: Sep. 7, 2004

(54) PHOTONIC INTEGRATED CIRCUIT (PIC) AND METHOD FOR MAKING SAME

(75) Inventors: Liyou Yang, Plainsboro, NJ (US); Ralph Doud Whaley, Princeton Junction, NJ (US); Tien Pei Lee, Holmdel, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 10/134,672

(22) Filed: Apr. 26, 2002

(65) Prior Publication Data

US 2002/0176467 A1 Nov. 28, 2002

Related U.S. Application Data

(60) Provisional application No. 60/287,277, filed on Apr. 27, 2001.

(51) Int. Cl.[7] .................................................. H01S 5/00
(52) U.S. Cl. .............................. 372/50; 372/43; 372/44; 372/45; 372/46; 372/47; 372/48; 372/49; 372/101
(58) Field of Search .............................. 372/43–50, 101

(56) References Cited

U.S. PATENT DOCUMENTS

| | | | | |
|---|---|---|---|---|
| 4,695,122 A | | 9/1987 | Ishida et al. ............. 350/96.12 |
| 4,695,859 A | * | 9/1987 | Guha et al. .................... 257/64 |
| 5,301,204 A | * | 4/1994 | Cho et al. ...................... 372/69 |
| 5,384,795 A | * | 1/1995 | Cho .............................. 372/7 |
| 5,416,861 A | * | 5/1995 | Koh et al. ..................... 385/14 |
| 5,453,405 A | | 9/1995 | Fan et al. ..................... 437/228 |
| 5,657,056 A | | 8/1997 | Izumi et al. ................. 345/205 |
| 5,897,332 A | * | 4/1999 | Hori et al. .................... 438/61 |
| 5,995,261 A | * | 11/1999 | Asous ......................... 359/163 |
| 6,072,117 A | * | 6/2000 | Matsuyama et al. ........ 136/256 |
| 6,117,753 A | * | 9/2000 | Hamamoto et al. ......... 438/503 |
| 6,483,863 B2 | * | 11/2002 | Forrest et al. ................ 372/50 |

* cited by examiner

Primary Examiner—Wilson Lee
Assistant Examiner—Delma R. Flores-Ruiz
(74) Attorney, Agent, or Firm—William J. Burke, Esq.

(57) ABSTRACT

A photonic integrated circuit including: at least one photonic component being suitable for operation with a plurality of photons and including an operational material having a bandgap energy close to the energy of the photons; and, at least one photonic component being suitable for operation with the plurality of photons, including an operational material having a bandgap energy substantially higher than the photons and being adjacent to the at least one photonic component including an operational material having a bandgap energy close to the energy of the photons. The at least one photonic component including an operational material having a bandgap energy substantially higher than the photons includes at least one amorphous silicon based alloy material.

32 Claims, 7 Drawing Sheets

PHOTONIC INTEGRATED CIRCUIT (PIC) AND METHOD FOR MAKING SAME

RELATED APPLICATION

This Application claims priority of U.S. Patent application Ser. No. 60/287,277, filed Apr. 27, 2001, entitled DISC/RING RESONATOR IR DETECTOR FOR PHOTONIC COMMUNICATIONS, the entire disclosure of which is hereby incorporated by reference as if being set forth in its entirety herein.

FIELD OF INVENTION

The present invention relates generally to Photonic Integrated Circuits (PICs) and methods for making the same.

BACKGROUND OF THE INVENTION

The use of Photonic Integrated Circuits (PICs) including III-V semiconductor compound photonic components or devices is desirable. Such circuits may be monolithic in nature. One example of such a PIC may take the form of an optical crossconnect including a large number of channel counts.

Coupling between active and passive components represents a fundamental difficulty to be overcome in integrating guided-wave photonic devices into PICs. Active components are those that generally require the bandgap of the operational material be close to the photon energy, such as a laser diode, a semiconductor optical amplifier (SOA) or an electroabsorption modulator, for example. Passive components generally exhibit a bandgap energy of an operational material to be substantially higher than a propagating photon, and may take the form of a waveguide based connector, splitter, coupler, optoelectronic switch or wavelength filtering element or wavelength selective element, such as a demultiplexer, for example.

Integration of active and passive components generally requires use of different materials. However, because of stringent lattice matching requirements for crystalline materials, integration of heterogeneous materials with different optical properties may be difficult.

Existing approaches to integrating active and passive components are believed to generally not be effective, leading to poor coupling and high losses, for example. As a result, efforts in integrating a large number of optoelectronic functions on a single chip may be problematic, particularly in telecommunications devices, for example.

Two general approaches include butt coupling and directional coupling. In butt coupling, the waveguide core stack may be selectively removed using chemical etching for example. An aligned passive waveguide structure may then be regrown. Drawbacks of such joints include the use of the growth step, in addition to difficulties associated with reproducing joint geometries, for example. Alternatively, a largely continuous passive waveguide structure having an active layer formed thereon may be used. The active layer may be selectively etched away in those portions intended to be passive.

Alternatively, a selective area growth (SAG) process leveraging differences in growth rates and masks may be used.

In vertical directional coupling, coupling between different epitaxial layers in the vertical plane serving as distinct waveguides may be utilized. Nonetheless, it is believed that each of these methods exhibits shortcomings. For example, the use of epitaxial growth in a manufacturing process limits choices of suitable materials. Losses at coupling points, such as butt joint interfaces, are typically significant, on the order of approximately 2–3 dB/interface for example. Further, typically realized poor manufacturing yields, that may be on the order of about 20%, also lead to high costs associated with these techniques.

Accordingly, it is highly desirable to provide PICs including active and passive devices and methods for making for them.

SUMMARY OF INVENTION

A photonic integrated circuit including: at least one photonic component being suitable for operation with a plurality of photons and including an operational material having a bandgap energy close to the energy of the photons; and, at least one photonic component being suitable for operation with the plurality of photons, including an operational material having a bandgap energy substantially higher than the photons and being adjacent to the at least one photonic component including an operational material having a bandgap energy close to the energy of the photons; wherein, the at least one photonic component including an operational material having a bandgap energy substantially higher than the photons includes at least one amorphous silicon based alloy material.

BRIEF DESCRIPTION OF THE FIGURES

Understanding of the present invention will be facilitated by consideration of the following detailed description of the preferred embodiments of the present invention taken in conjunction with the accompanying drawings, wherein like numerals refer to like parts and in which.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, many other elements found in typical photonic devices, Photonic Integrated Circuits (PICs), optical waveguides and manufacture methods relating thereto. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure herein is directed to all such variations and modifications to such devices, PICs, waveguides and methods known to those skilled in the art.

According to an aspect of the present invention, amorphous silicon (a-Si) materials may be used to provide flexible, index matched, low loss waveguide coupling to active and passive device components in a monolithically integrated optoelectronic product. According to an aspect of the present invention, amorphous silicon (a-Si) materials, including a-Si:H and a-Si:F based alloys such as a-SiC$_x$ where 0<x<1, a-SiN$_y$ where 0<y<1.33, a-SiO$_z$ where 0<z<2 and a-SiGe$_w$ where 0<w<1 may be utilized to form waveguides for integrating active and passive components in optoelectronic products. Because of their amorphous nature, a-Si materials do not have the lattice match requirements of crystalline materials. Furthermore, the ability to tune the optical index substantially continuously, from 1.5 to 4 for example, provides for improved index matching and low loss waveguide coupling to active components as compared to conventional techniques.

According to an aspect of the present invention, a-Si material, such as a-Si:H or a-Si:F alloy based, waveguides may be fabricated using Plasma Enhanced Chemical Vapor Deposition (PECVD), resulting in a low intrinsic optical absorption coefficient (approximately 0.1 cm$^{-1}$ at 1.55 $\mu$m), allowing the development of low-loss waveguide structures. The electronic and optical characteristics of a-Si materials may be altered depending on the waveguide formation method, such as sputtering or PECVD. For example, sputtered a-Si has been generally characterized as having a high density of states in the forbidden band and optical absorption coefficients greater than 10 cm$^{-1}$ at 1.55 $\mu$m. However, PECVD a-Si materials may exhibit lower absorption coefficients in the infrared wavelengths, such as in the range of 1.3 and 1.55 $\mu$m.

In the case of such a-Si materials, optical absorption at an operating wavelength of 1.55 $\mu$m is desirably low, leading to low loss and good optical transmission properties as will be understood by those possessing an ordinary skill in the pertinent arts. For example, the absorption coefficient corresponding to a-Si:H may be approximately 0.1 cm$^{-1}$, advantageously providing for waveguide losses on the order of approximately 0.5 dB/cm at 1.55 $\mu$m, for example.

Further, by mixing the main gas that undergoes plasma assisted decomposition in the a-Si material PECVD process, such as SiH$_4$, with other chemicals, such as CH$_4$, CO$_2$, N$_2$, NH$_3$ or N$_2$O, wider energy gaps may be achieved with lower refractive indices.

Figure 1:
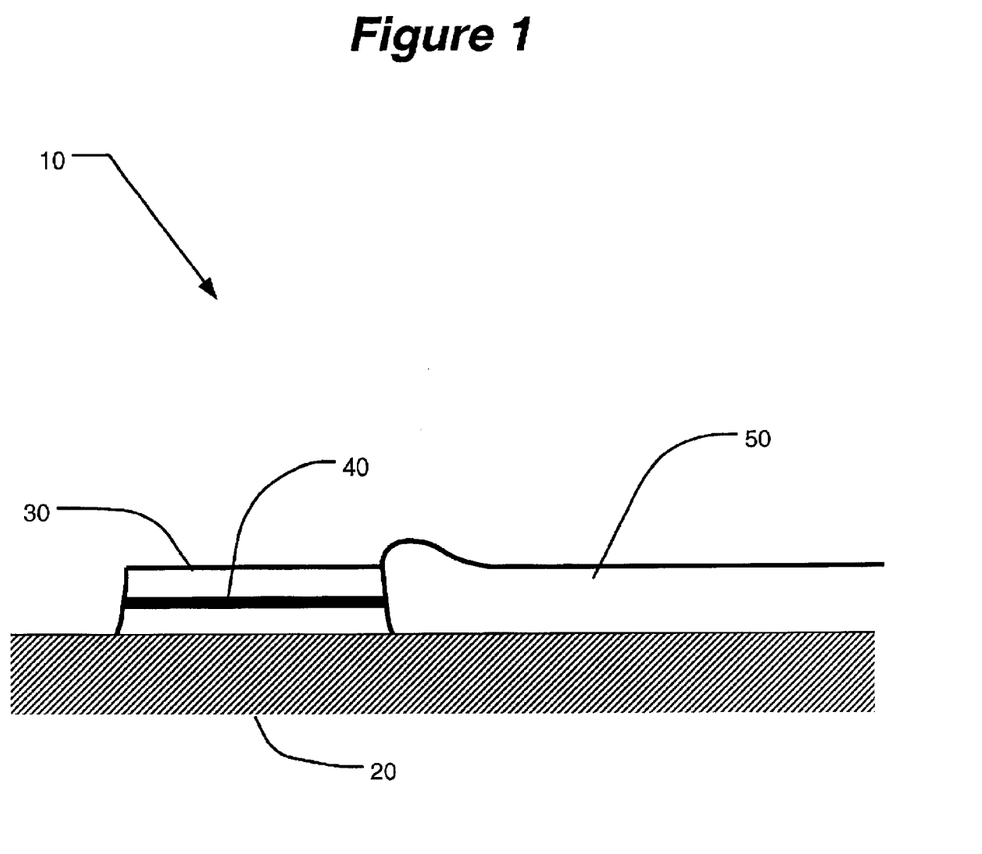
FIG. 1 illustrates a cross-sectional view of an a-Si material/III-V active device heterogeneous integration according to an aspect of the present invention.

FIG. 1 illustrates a cross-sectional view of an a-Si/III-V semiconductor active device heterogeneous integration 10 according to an aspect of the present invention. The integration 10 includes a substrate 20, active device 30, that may include multiple quantum well (MQW) layer 40, and a-Si material waveguide 50.

Substrate 20 may take the form of any suitable conventional semiconductor substrate such as InP, GaAs or GaN for example or c-Si, which may form a base structure for a PIC. Active device 30 may take the form of a conventional type III-V semiconductor active component or device, such as a semiconductor laser for example. The formation and use of such substrates and active devices are well understood by those possessing an ordinary skill in the pertinent arts.

Waveguide 50 may be formed of amorphous silicon (a-Si) material, including a-Si:H and a-Si:F based alloys such as a-SiCx where 0<x<1, a-SiN$_y$ where 0<y<1.33, a-SiO$_z$ where 0<z<2 and a-SiGe$_w$ where 0<w<1 thereof. Waveguide 50 may be suitable for use in an operating range such as 1.3 or 1.55 $\mu$m. The formation and use of such waveguides is well understood by those possessing an ordinary skill in the pertinent arts.

For example, waveguide 50 may take the form of an a-Si alloy material layer having a refractive index of approximately 3.4 deposited upon an a-Si alloy material undercladding layer having a refractive index of approximately 3.2 in turn deposited on a c-Si wafer. The a-Si alloy undercladding layer may be approximately 1 $\mu$m thick, while the a-Si:H alloy core may be approximately 0.5 $\mu$m thick. An a-Si alloy material layer having a refractive index of approximately 3.2 may be provided as an overcladding layer, and have a thickness of approximately 1 $\mu$m for example. The a-Si alloy under- and overcladding may be formed using RF or DC plasma assisted decomposition of SiH$_4$ or N$_2$ (see FIG. 4), for example. In the case of N$_2$, an N$_2$ to SiH$_4$ flow ratio of approximately 0.9 may be used while the substrate temperature is held at approximately 250° C. To form the a-Si alloy core layer, the N$_2$ to SiH$_4$ flow ratio may be approximately 0.45, while the substrate temperature is held at approximately 250° C. Processing pressure may be approximately 1.5 torr, while the 13.56-MHz RF power is held approximately at 50 W, for example.

The waveguide, and core thereof, may be defined using standard photolithographic patterning of the planar amorphous stack and plasma etching, for example. A standard planarization step, such as mechanical polishing may be used to further reduce coupling losses, for example.

Referring still to FIG. 1, use of a-Si material waveguide 50 in integration 10 provides several advancements in the art. For example, the refractive index of the a-Si waveguide 50 may be readily tuned to be compatible with a variety of III-V semiconductor active components. Further, use of a-Si materials generally provides for ready integration of active type III-V semiconductor devices, low optical coupling loss, the ability to use relatively low temperature processing technologies, as compared to epitaxial growth for example, that may be on the order of 250° C., and the ability to realize relatively low cost, high yield manufacturing processes.

Figure 2:
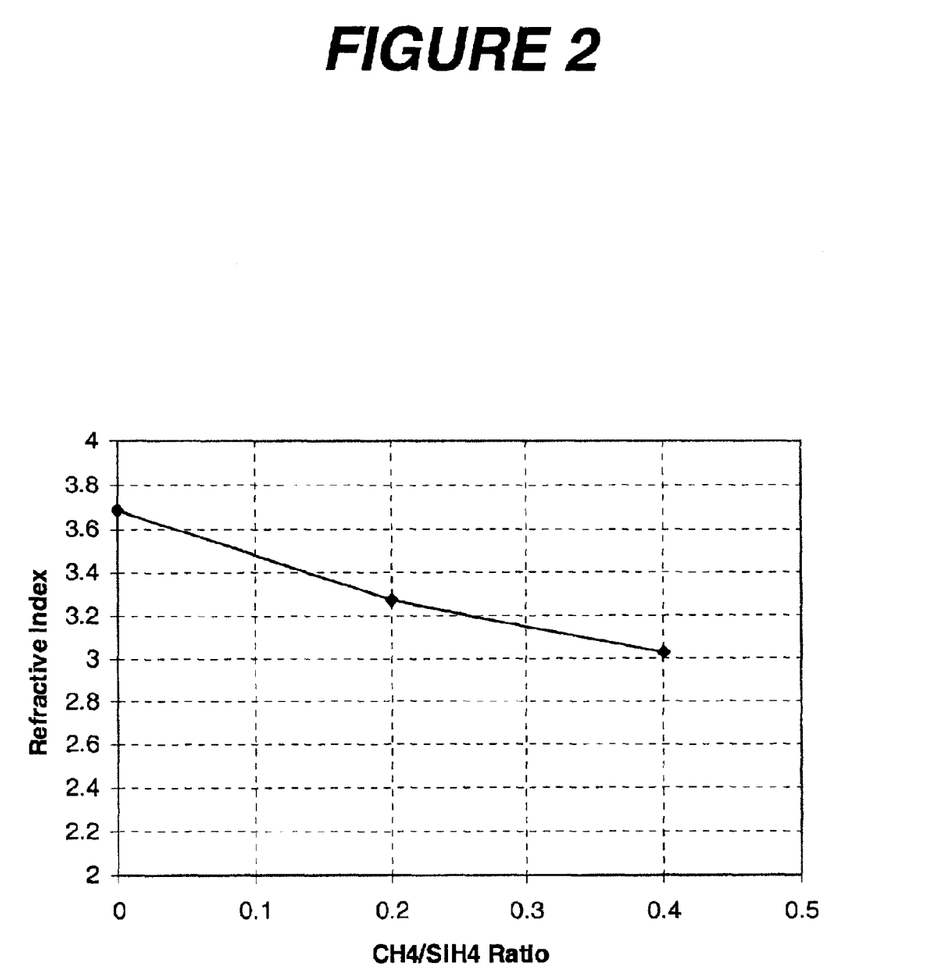
FIG. 2 illustrates a chart presenting achievable refractive indices as a function of a ratio of $CH_4$ to $SiH_4$ used in a PECVD process to form a waveguide material including a-$SiC_x$ using conventional techniques.
Figure 3:
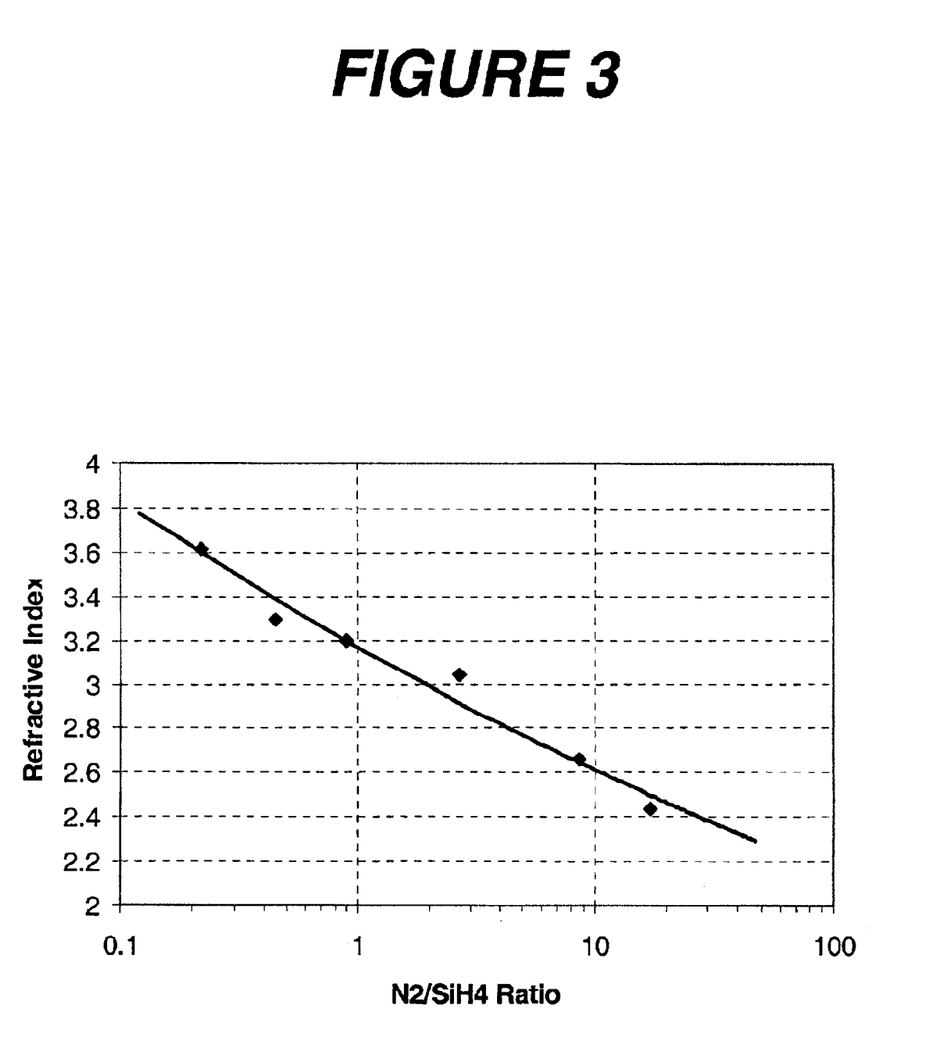
FIG. 3 illustrates a chart presenting achievable refractive indices as a function of a ratio of $N_2$ to $SiH_4$ used in a PECVD process to form a waveguide material including a-$SiN_x$ using conventional techniques.

Referring now to FIG. 2, there is shown a chart illustrating achievable refractive indices as a function of a ratio of CH$_4$ to SiH$_4$ used in a PECVD process to form a waveguide including a-SiC$_x$. Referring now also to FIG. 3, there is shown a chart illustrating achievable refractive indices as a function of a ratio of N$_2$ to SiH$_4$ used in a PECVD process to form a waveguide material including a-SiN$_y$. Thus, a-Si material waveguide 50 may be formed such as to have a desired refractive index being suitable for use with a particular type III-V semiconductor device, such as device 30 (FIG. 1).

Figure 4:
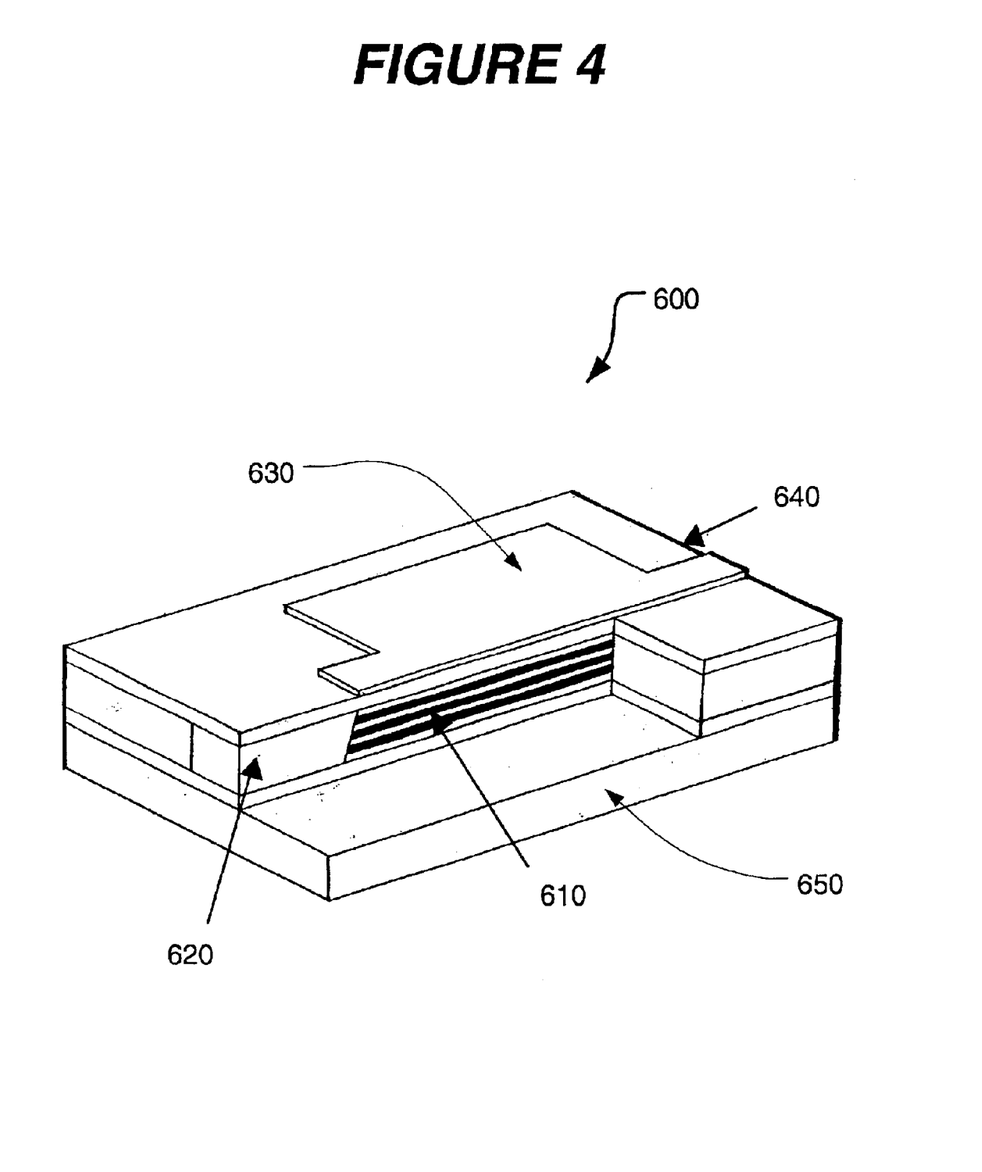
FIG. 4 illustrates a PIC according to an aspect of the present invention.

Referring now to FIG. 4, there is illustrated a PIC 600 according to an aspect of the present invention. PIC 600 generally includes substrate 650 having active device 610 and passive device 620 formed thereon. Substrate 650 may take any suitable form, such as c-Si or suitable semiconductor compound, for example. Active device 610 may take the form of a semiconductor laser, for example, including multiple quantum wells. Device 620 may take the form of a waveguide, such as an a-SiN$_y$ waveguide. Device 610 may include a contact 630 and mirror 640 as is conventionally understood by those possessing an ordinary skill in the pertinent arts.

Figure 5:
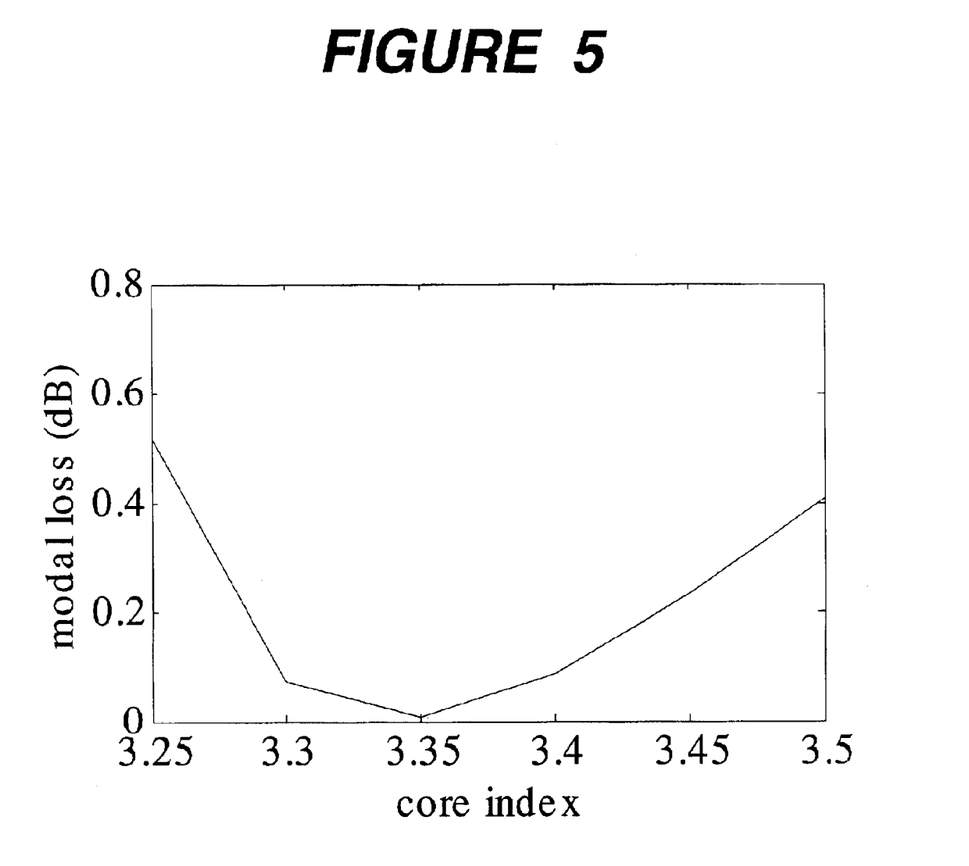
FIG. 5 illustrates a typical modal loss as a function of core index.

According to an aspect of the present invention, the interface between devices 610, 620 may be indexed matched as is conventionally understood, and device 620 may provide a low optical absorption consistently with as has been set forth with regard to FIGS. 1–3. Further, a low interface reflection may be achieved and be desirable for use with active component 610, as for example where the difference in refractive index ($\Delta n$)<0.01, reflectivity (R)<$10^{-5}$. Further, use of PECVD for formation of the device 620 provides for improved surface conformation with device 610 at the device 610, 620 interface, and low interface scattering loss, as opposed to sputtering for example. For example, referring now to FIG. 5, there is shown a typical modal loss as a function of core index. Referring again to FIGS. 2 and 3, as will be apparent to one possessing an ordinary skill in the pertinent arts, core indexes represented in FIG. 5 may be achieved using $SiH_4$ and $CH_4$ or $N_2$ in a PECVD process.

Referring to FIGS. 6–9 there are shown some non-limiting examples of possibilities for Photonic Integrated Circuits (PICs) according to the present invention.

Figure 6:
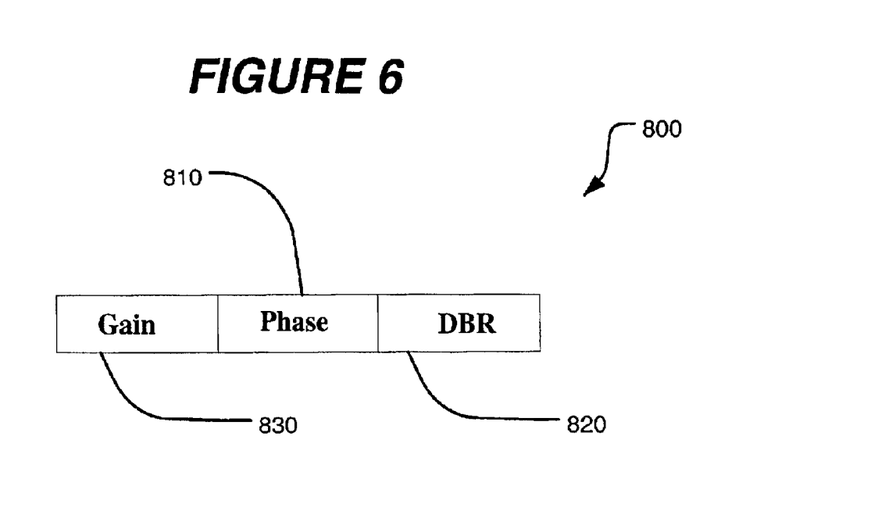
FIGS. 6–9 illustrate some non-limiting examples of possibilities for Photonic Integrated Circuits (PICs) according to the present invention.

Referring now also to FIG. 6, there is shown a block-diagrammatic representation of a monolithically integrated tunable laser module 800 according to an aspect of the present invention. The phase and the distributed Bragg reflector grating regions 810, 820 of tunable laser module 800 can be realized using index matched plasma enhanced chemical vapor deposited a-Si material. Additionally, a gain region 830 may be realized using conventional type III-V semiconductor materials, for example.

Figure 7:
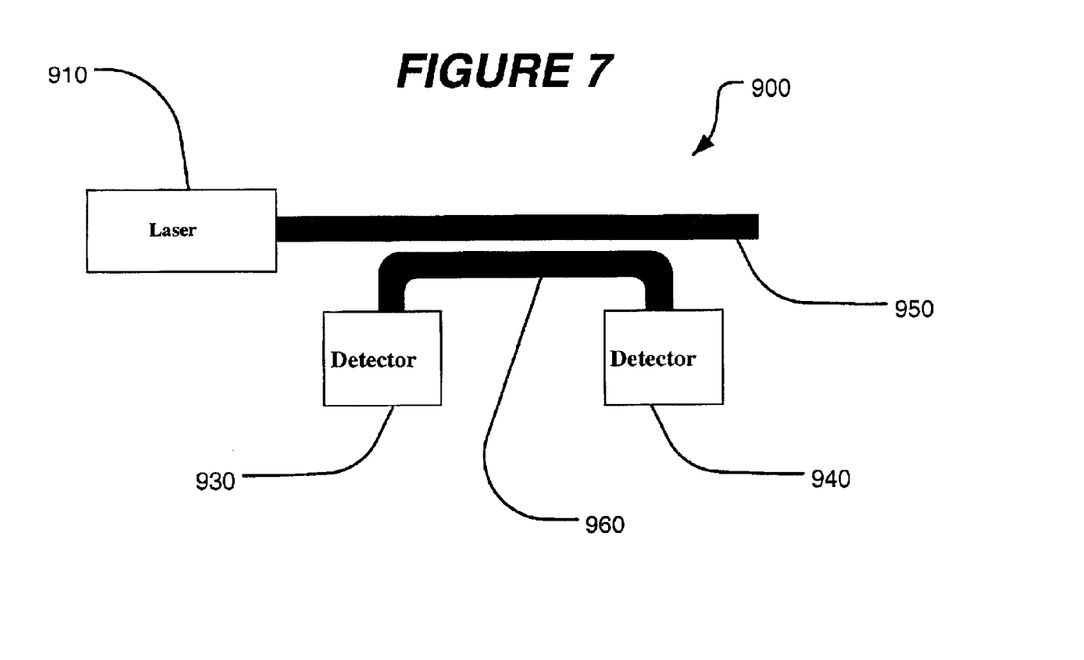

Referring now also to FIG. 7, there is shown a waveguide 950 coupled to a transmission source 910, such as a laser. Coupler 960 is coupled to optical detectors 930, 940. The waveguide 950 and coupler 960 may be made from plasma enhanced chemical vapor deposited a-Si materials, while laser 910 and detectors 930, 940 may be made of III-V semiconductor materials as is conventionally understood.

Figure 8:
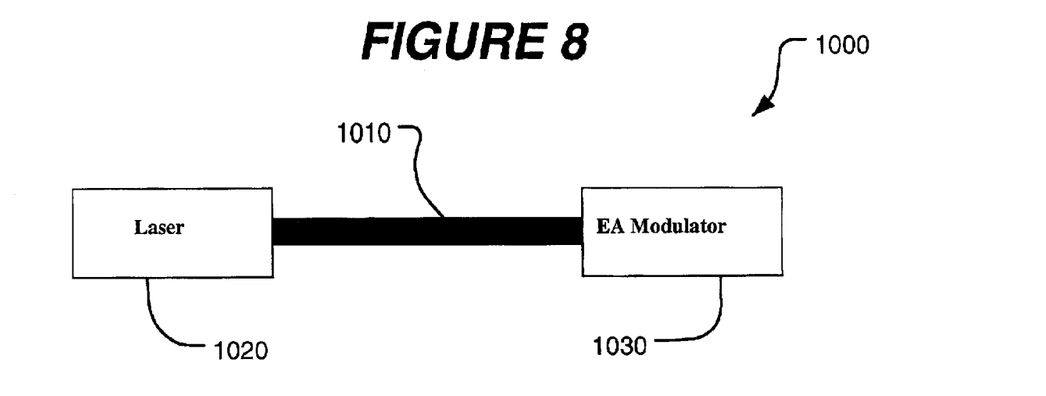

Referring now also to FIG. 8, there is shown a PIC 1000 according to an aspect of the present invention including a waveguide 1010 coupling laser 1020 and electroabsorption modulator 1030. Waveguide 1010 may be made from index matched plasma enhanced chemical vapor deposited a-Si material, while laser 1020 and EA modulator 1030 are made of type III-V semiconductor materials, for example.

Figure 9:
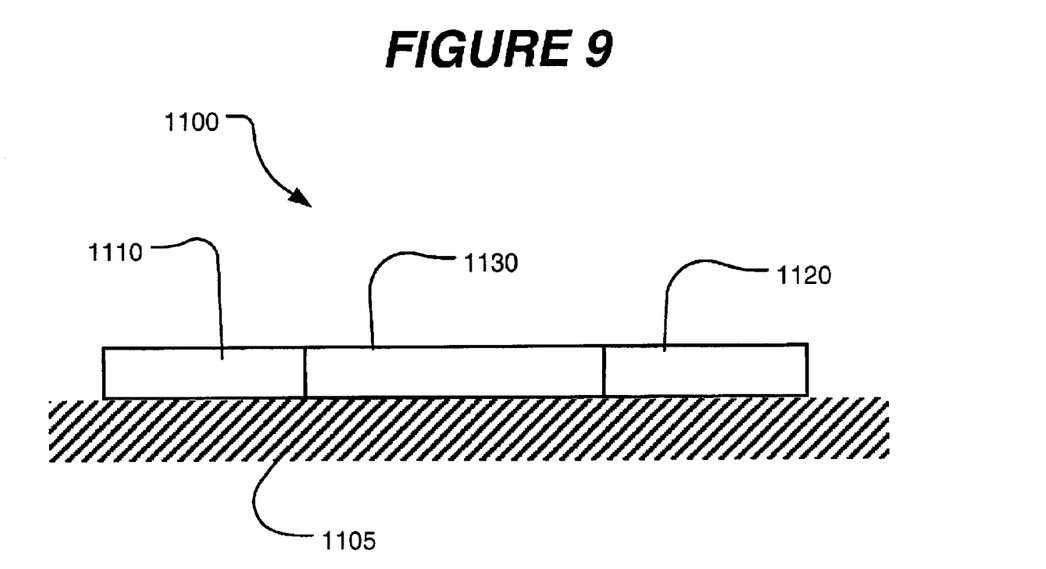

Referring now also to FIG. 9, there is shown a general illustration of a PIC 1100 according to an aspect of the present invention. PIC 1100 generally includes a substrate 1105 having active components 1110, 1120 and passive component 1130 optically coupling devices 1110 and 1120 to one another formed thereon. Substrate 1105 may take the form of c-Si. Active components 1110, 1120 may take the form of type III-V semiconductor active devices. Passive component 1130 may take the form of a plasma enhanced chemical vapor deposited amorphous silicon (a-Si) material waveguide, such as a-Si:H and a-Si:F based alloys like $a\text{-}SiC_x$ where 0<x<1, $a\text{-}SiN_y$ where 0<y<1.33, $a\text{-}SiO_z$ where 0<z<2 and $a\text{-}SiGe_w$ where 0<w<1. Components 1110, 1120 may be formed using conventional techniques. Waveguide 1130 may then be formed using plasma enhanced chemical vapor deposition consistently with as has been set forth herein. As will be recognized by those possessing an ordinary skill in the pertinent art, as lower processing temperatures associated with the formation of waveguide 1130 may be used, as compared to epitaxial growth for example, formation of waveguide 1130 should not adversely effect formed devices 1100, 1120.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. A photonic integrated circuit comprising:
    at least one photonic component being suitable for operation with a plurality of photons and comprising an operational material having a bandgap energy close to the energy of said photons; and,
    at least one photonic component being suitable for operation with said plurality of photons, comprising an operational material having a bandgap energy substantially higher than said photons and being adjacent to and suitable for providing optical interconnectivity for said at least one photonic component comprising an operational material having a bandgap energy close to the energy of said photons;
    wherein, said at least one photonic component comprising an operational material having a bandgap energy substantially higher than said photons comprises at least one amorphous silicon based alloy material.

2. The photonic integrated circuit of claim 1, wherein said amorphous silicon based alloy material is plasma enhanced chemical vapor deposited.

3. The photonic integrated circuit of claim 1, wherein said amorphous silicon based alloy material comprises at least one material selected from the group consisting essentially of: a-Si:H and a-Si:F based alloys.

4. The photonic integrated circuit of claim 1, wherein said amorphous silicon based alloy material comprises at least one material selected from the group consisting essentially of hydrogenated or fluorinated: $a\text{-}SiC_x$ where 0<x<1, $a\text{-}SiN_y$ where 0<y<1.33, $a\text{-}SiO_z$ where 0<z<2 and $a\text{-}SiGe_w$ where 0<w<1.

5. The photonic integrated circuit of claim 1, wherein said at least one photonic component comprising an operational material having a bandgap energy close to the energy of said photons comprises a photonic transmission source.

6. The photonic integrated circuit of claim 5, wherein said photonic transmission source is a laser.

7. The photonic integrated circuit of claim 1, wherein said at least one photonic component comprising an operational material having a bandgap energy close to the energy of said photons comprises an electroabsorption modulator.

8. The photonic integrated circuit of claim 1, wherein said at least one photonic component comprising an operational material having a bandgap energy close to the energy of said photons comprises a semiconductor optical amplifier.

9. The photonic integrated circuit of claim 1, wherein said at least one photonic component comprising an operational material having a bandgap energy substantially higher than said photons comprises a waveguide based connector.

10. The photonic integrated circuit of claim 1, wherein said at least one photonic component comprising an operational material having a bandgap energy substantially higher than said photons comprises a waveguide based splitter.

11. The photonic integrated circuit of claim 1, wherein said at least one photonic component comprising an operational material having a bandgap energy substantially higher than said photons comprises a wavelength filtering element.

12. The photonic integrated circuit of claim 1, wherein said at least one photonic component comprising an operational material having a bandgap energy substantially higher than said photons comprises a wavelength selective element.

13. The photonic integrated circuit of claim 12, wherein said wavelength selective element comprises a wavelength demultiplexer.

14. The photonic integrated circuit of claim 1, wherein said at least one photonic component comprising an operational material having a bandgap energy substantially higher than said photons comprises a distributed bragg grating reflector.

15. The photonic integrated circuit of claim 10, wherein said at least one photonic component comprising an operational material having a bandgap energy substantially higher than said photons further comprises a phase region.

16. The photonic integrated circuit of claim 11, wherein said at least one photonic component comprising an operational material having a bandgap energy close to the energy of said photons comprises a gain region.

17. The photonic integrated circuit of claim 1, wherein said at least one photonic component comprising an operational material having a bandgap energy close to the energy of said photons comprises at least one photonic detector.

18. The photonic integrated circuit of claim 13, wherein said at least one photonic detector comprises a plurality of photonic detectors.

19. The photonic integrated circuit of claim 1, wherein said at least one photonic component comprising an operational material having a bandgap energy close to the energy of said photons comprises at least one type III-V semiconductor device.

20. The photonic integrated circuit of claim 15, wherein said at least one type III-V semiconductor device comprises a plurality of type III-V semiconductor devices, and said at least one photonic component comprising an operational material having a bandgap energy substantially higher than said photons optically couples said type III-V semiconductor devices to one another.

21. A photonic integrated circuit comprising:
a plurality of type III-V semiconductor photonic devices; and,
at least one amorphous silicon material waveguide optically coupling said plurality of type III-V semiconductor photonic devices together.

22. The photonic integrated circuit of claim 21, wherein said at least one amorphous silicon material waveguide is plasma enhanced chemical vapor deposited.

23. The photonic integrated circuit of claim 21, wherein said amorphous silicon material comprises at least one material selected from the group consisting essentially of: a-Si:H and a-Si:F based alloys.

24. The photonic integrated circuit of claim 21, wherein said amorphous silicon material comprises at least one material selected from the group consisting essentially of hydrogenated or fluorinated: a-SiC$_x$ where 0<x<1, a-SiN$_y$ where 0<y<1.33, a-SiO$_z$ where 0<z<2 and a-SiGe$_w$ where 0<w<1.

25. The photonic integrated circuit of claim 21, wherein said plurality of type III-V semiconductor photonic devices and at least one waveguide are index matched.

26. The photonic integrated circuit of claim 21, wherein said plurality of type III-V semiconductor photonic devices comprises at least one laser.

27. The photonic integrated circuit of claim 21, wherein said plurality of type III-V semiconductor photonic devices comprises at least one electroabsorption modulator.

28. The photonic integrated circuit of claim 21, wherein said plurality of type III-V semiconductor photonic devices comprises at least one semiconductor optical amplifier.

29. The photonic integrated circuit of claim 17, wherein said plurality of type III-V semiconductor photonic devices comprise at least one photonic detector.

30. A method for forming a photonic integrated circuit comprising:
forming at least one type III-V semiconductor device on a substrate; and,
forming at least one amorphous silicon material waveguide on said substrate using plasma enhanced chemical vapor deposition;
wherein said at least one waveguide is optically coupled to said at least one type III-V semiconductor conductor device.

31. The method of claim 30, wherein said amorphous silicon material comprises at least one material selected from the group consisting essentially of: a-Si:H and a-Si:F based alloys.

32. The method of claim 30, wherein said amorphous silicon material comprises at least one material selected from the group consisting of hydrogenated or fluorinated: a-SiC$_x$ where 0<x<1, a-SiN$_y$ where 0<y<1.33, a-SiO$_z$ where 0<z<2 and a-SiGe$_w$ where 0<w<1.

* * * * *